United States Patent Office 3,328,123
Patented June 27, 1967

3,328,123
CLARIFICATION OF CONCENTRATED WET PROCESS PHOSPHORIC ACID
Kenneth Lee Parks and Donald Richard Randolph, Lakeland, Fla., assignors to American Cyanamid Company, Stamford, Conn., a corporation of Maine
No Drawing. Filed Mar. 4, 1964, Ser. No. 349,483
7 Claims. (Cl. 23—165)

The present invention relates to the treatment of concentrated, crude wet process phosphoric acid. More particularly, it relates to the treatment of concentrated, crude wet process phosphoric acid by treatment with an inorganic ammonium salt for the removal of iron and aluminum impurities therefrom. Still more particularly, the invention is concerned with a novel process for obtaining minimal post-precipitation in a concentrated phosphoric acid from about 46% to about 65% $P_2O_5$ and containing from 0.75% to 2.5% iron by weight and from 0.8% to 2.0% aluminum by weight, all in the form of their oxides, which involves adding to said concentrated phosphoric acid at from about room temperature to about 180° F. from 0.3% to about 2% of an inorganic ammonium salt, then aging said mixture from one to fourteen days and precipitating therefrom a complex aluminum-iron phosphate separating the precipitated complex from the resultant clarified phosphoric acid and, finally, recovering for storage or shipping the so-treated, substantially precipitate free, concentrated phosphoric acid.

It is well known that wet process phosphoric acid concentrated to about 54% $P_2O_5$, or higher, will deposit solids when stored. However, solids continue to precipitate out of solution for an indefinite period of time. In the main, it has been generally accepted that crude wet process concentrated phosphoric acid will contain precipitating solids. These solids have not been completely identified but are generally classified as complex iron and aluminum phosphates. The phenomenon of continuing precipitation is known as post-precipitation because solids continue to precipitate even after the acid has been clarified one or more times.

Post-precipitation is indeed a troublesome phenomenon. This is because solids accumulate in storage tanks and must be subsequently removed. Second, solids accumulate in tank cars which are used for shipping phosphoric acid. In the latter situation, it is particularly difficult to unload tank cars containing large quantities of sludge in their bottoms. A problem of cleaning such tank cars and of eliminating phosphatic waste materials arises. This problem of post-precipitation can be substantially reduced when phosphate rock containing small amounts of iron and aluminum, usually less than 0.5% and 0.5%, respectively, are employed in the manufacture of phosphoric acid. However, a low iron and aluminum rock cannot always be obtained. High content iron rock is more readily available and the latter type tends to yield a viscous product containing large amounts of dissolved iron which indeed aggravates the problem of post-precipitation. Consequently, if the amount of iron in crude phosphoric wet process acid can be reduced to a minimum, post-precipitation can also be minimized. Several methods have been proposed to reduce the iron content of phosphoric acid as produced. Unfortunately, none has been wholly successful. The most successful method involves a process for the aging or settling of the acid for a number of days followed by clarification by means of either filtration or by centrifuging. This approach to the problem has the marked disadvantage that although some of the iron may be removed, the metallic content of the resultant acid as manufactured varies widely. It is usually higher than desired, particularly when a rock with higher than normal iron content has been employed as a feed material in the manufacture of the acid.

It is a principal object of the invention to provide an improved method for utilizing low grade high iron content rock in preparing crude wet process concentrated phosphoric acid. It is a further object to provide a method whereby the iron content of wet process phosphoric acid can be reduced to such acceptable low limits that post-precipitation of iron-containing phosphates is minimized. Other objects and advantages will become apparent from a consideration of the ensuing description.

It has been unexpectedly discovered that the addition of an ammonium salt to wet process phosphoric acid will produce an initial precipitate containing iron and aluminum complexes. Removal of the latter indicates that resultant phosphoric acid contains only small amounts of iron and aluminum phosphates and that minimal post-precipitation is observed thereafter. Although it is well known that iron and aluminum can be precipitated from phosphoric acid by neutralizing the phosphoric acid, for instance, with an ammonium base by the addition of ammonium carbonate or ammonium hydroxide, nonetheless, in the present procedure, to no extent does neutralization of the phosphoric acid take place.

According to the process of the present invention, minimal post-precipitation of concentrated phosphoric acid from about 46% to about 65% $P_2O_5$, and preferably of 54% $P_2O_5$, is realized when from 0.3% to about 2% of an ammonium salt is added directly to the said concentrated phosphoric acid. A precipitate of a complex iron aluminum phosphate is observed after the mixture is allowed to age for from twelve hours to fourteen days and preferably from 4 to 8 days, at from room temperature to about 180° F. The precipitate is then removed and after analysis of the iron and aluminum contents remaining in the solution, it is observed that a significant amount of the aluminum and substantially all of the iron have been removed from the solution.

In general, any commercially available wet process concentrated phosphoric acid containing at least 54% $P_2O_5$ can be employed. The iron content as iron oxide ranges from about 0.75% to about 2.5% and the aluminum content from about 0.8% to about 2.0%. The acid is prepared usually by evaporation techniques employing 28% to 32% $P_2O_5$.

Advantageously, a wide variety of inorganic ammonium salts can be utilized herein. Illustrative of the latter are the ammonium halides, such as ammonium chloride, ammonium bromide or ammonium iodide, diammonium phosphate, ammonium nitrate and ammonium sulfate. If desired, the ammonium ion may be introduced initially in the form of ammonia gas.

In order to facilitate a further understanding of the invention, the following examples are presented primarily for the purpose of illustrating certain more specific details thereof. The examples are not to be deemed limitative of the invention, except as defined in the claims. Unless otherwise noted, all parts are by weight.

*Example 1*

A hot concentrated wet process phosphoric acid obtained from an evaporator as manufactured and analyzing as 54% $P_2O_5$, 2.25% iron oxide and 1.05% aluminum oxide is divided into four aliquot parts. One aliquot part is maintained as control. The remaining three aliquot parts are treated with amounts of ammonium sulfate as set forth in the table below. All the portions are held at room temperature while agitating and are then analyzed at intervals for aluminum oxide and iron oxide as indicated in Table I below.

Portions of the liquid mixture are withdrawn and solids are then filtered and analyzed or assayed. During the second day, the treated portions develop a heavy precipitate and the untreated material is clear after four days. At the end of eight days, the tests are terminated and all the portions analyzed. The results are summarized in Table I below.

TABLE I

| Wet Process H₃PO₄ (54% P₂O₅) | Analysis as percent Fe₂O₃ | | |
|---|---|---|---|
| | In 0 day | 4 days | 10 days |
| Untreated | 2.26 | 2.08 | 1.88 |
| 0.5% NH₄⁺ added | 2.27 | 1.90 | 0.90 |
| 1.0% NH₄⁺ added | 2.26 | 1.14 | 1.02 |
| 2.0% NH₄⁺ added | 2.33 | 1.46 | 0.87 |

| Wet Process H₃PO₄ (54% P₂O₅) | Analysis as percent Al₂O₃ | | |
|---|---|---|---|
| | In 0 day | 4 days | 10 days |
| Untreated | 1.05 | 1.08 | 1.08 |
| 0.5% NH₄⁺ added | 1.05 | 0.96 | 0.91 |
| 1.0% NH₄⁺ added | 1.03 | 0.96 | 0.91 |
| 2.0% NH₄⁺ added | 1.05 | 9.95 | 0.90 |

From an examination of the data presented in Table I, it can be seen that with an equivalent of ammonium ion as well as twice the amount of ammonium ion the amount of iron oxide remaining in the resultant phosphoric acid liquid is reduced approximately 100% or more after ten days of treatment. With such infinitesimal amounts of iron, precipitation either in storage tanks or tank cars has been minimized and, thus, can be more effectively utilized in the storage and shipping of crude concentrated wet process phosphoric acid.

Similar results are obtained employing ammonium monohydrogen phosphate, ammonium dihydrogen phosphate, ammonium chloride, ammonium iodide and ammonium nitrate.

*Example 2*

The procedure of Example 1 is repeated in every detail, except that both ammonium and sodium ions are employed for purposes of comparison. In this example, it will be clearly seen that sodium ion cannot be considered equivalent for purposes of clarifying concentrated crude phosphoric acid.

The process of Example 1 is modified by utilizing 0.3% ammonium ion and 0.3% sodium ion in the form of their corresponding sulfates. Each of the treated acids containing separately 0.3% ammonium ion and 0.3% sodium ion is subjected to tumbling on a roller for eighteen hours. Resultant compositions are then allowed to stand for an additional three and one-half days and aliquot portions are assayed for iron oxide. The results obtained in these tests are presented in Table II below.

TABLE II

| Acid: | Analysis as percent Fe₂O₃ |
|---|---|
| 54% acid, untreated | 1.97 |
| 54% acid, 0.3% NH₄⁺ added | 1.48 |
| 54% acid, 0.3% Na⁺ added | 1.95 |

It will be seen that the analysis of iron oxide utilizing 0.3% ammonium ion after treatment shows 1.48%, whereas untreated acid contains 1.97%. Substantially no improvement occurs with respect to the use of sodium ion. Advantageously, using 0.3% ammonium ion, an improvement greater than 20% is observed utilizing such small amounts of ammonium ion.

We claim:
1. In a process for obtaining minimal post-prescipitation of concentrated wet process phosphoric acid of from about 46% to about 65% P₂O₅ and containing from about 0.75% to about 2.5% iron by weight and from about 0.8% to about 2.0% aluminum by weight, all in the form of their oxides, the improvement which comprises the steps of: adding at from room temperature to about 180° F. from about 0.3% to about 2% of a simple, inorganic ammonium salt to said concentrated phosphoric acid, aging said mixture from about one to fourteen days, precipitating aluminum and iron phosphate complexes, separating resultant clarified concentrated wet process phosphoric acid from said precipitated complexes, and recovering for storage or shipping, the so-treated, substantially precipitate free, concentrated wet process phosphoric acid.

2. A process according to claim 1, in which the acid to be treated contains 54% P₂O₅, 2.25% iron oxide and 1.05% aluminum oxide.

3. A process according to claim 1, in which the ammonium salt is ammonium sulfate.

4. A process according to claim 1, in which the ammonium salt is ammonium nitrate.

5. A process according to claim 1, in which the ammonium salt is diammonium phosphate.

6. A process according to claim 1, in which the ammonium salt is ammonium dihydrogen phosphate.

7. A process according to claim 1, in which the ammonium salt is ammonium chloride.

References Cited

UNITED STATES PATENTS 3,259,458    7/1966    Petersen et al. _____ 23—165

OSCAR R. VERTIZ, *Primary Examiner.*

O. F. CRUTCHFIELD, *Assistant Examiner.*